Figure 1:
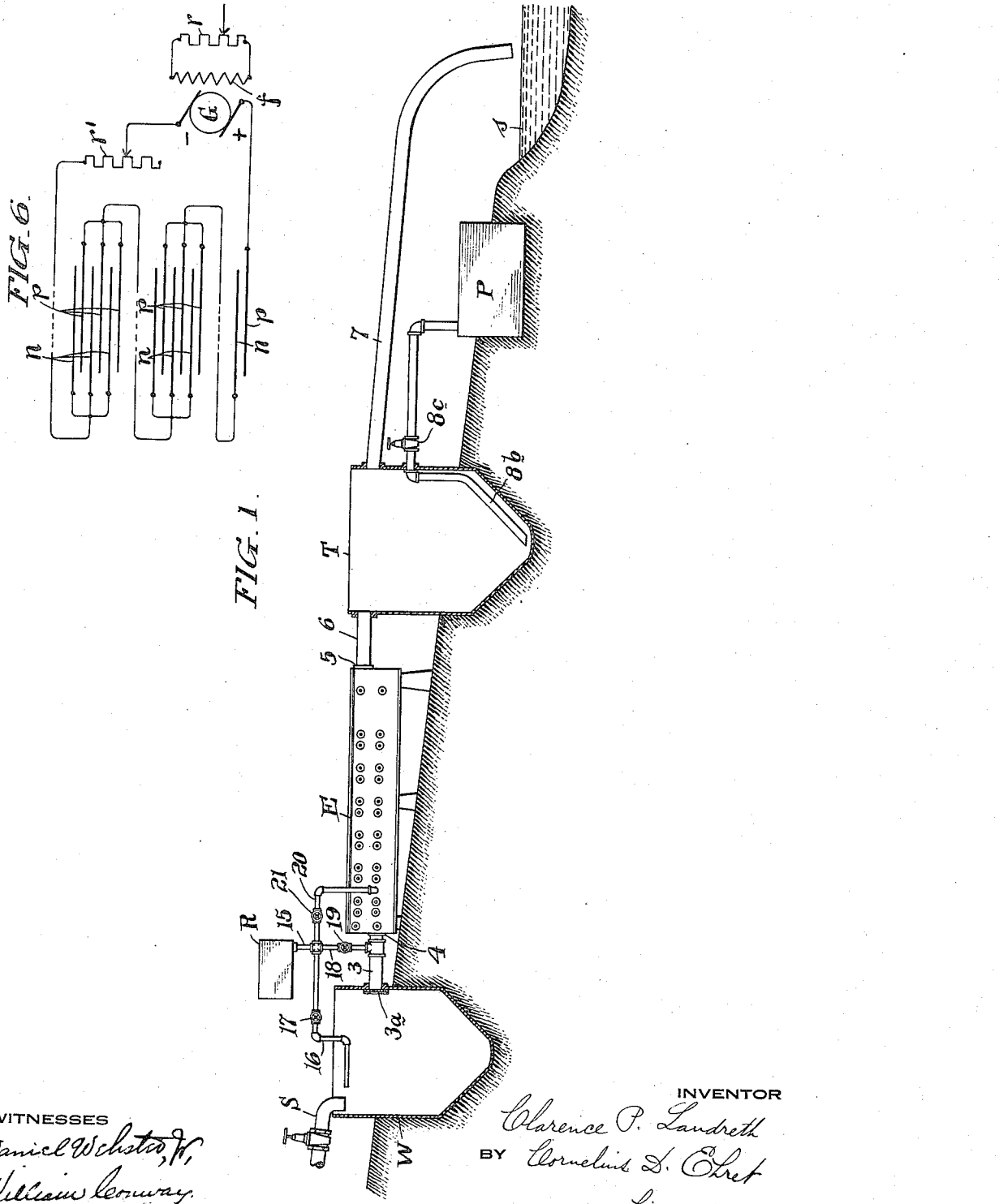

C. P. LANDRETH.
ELECTROCHEMICAL PROCESS OF TREATING WATERS, LIQUIDS, AND SEWAGE.
APPLICATION FILED OCT. 12, 1914.

1,139,778.

Patented May 18, 1915.

INVENTOR
Clarence P. Landreth
BY Cornelius D. Ehret
his ATTORNEY

WITNESSES
Daniel Webster
William Conway

C. P. LANDRETH.
ELECTROCHEMICAL PROCESS OF TREATING WATERS, LIQUIDS, AND SEWAGE.
APPLICATION FILED OCT. 12, 1914.

1,139,778.

Patented May 18, 1915.
3 SHEETS—SHEET 2.

FIG. 2.

WITNESSES
Daniel Webster Jr.
William Conway.

INVENTOR
Clarence P. Landreth
BY Cornelius L. Ehret
his ATTORNEY

C. P. LANDRETH.
ELECTROCHEMICAL PROCESS OF TREATING WATERS, LIQUIDS, AND SEWAGE.
APPLICATION FILED OCT. 12, 1914.
1,139,778. Patented May 18, 1915.
3 SHEETS—SHEET 3.
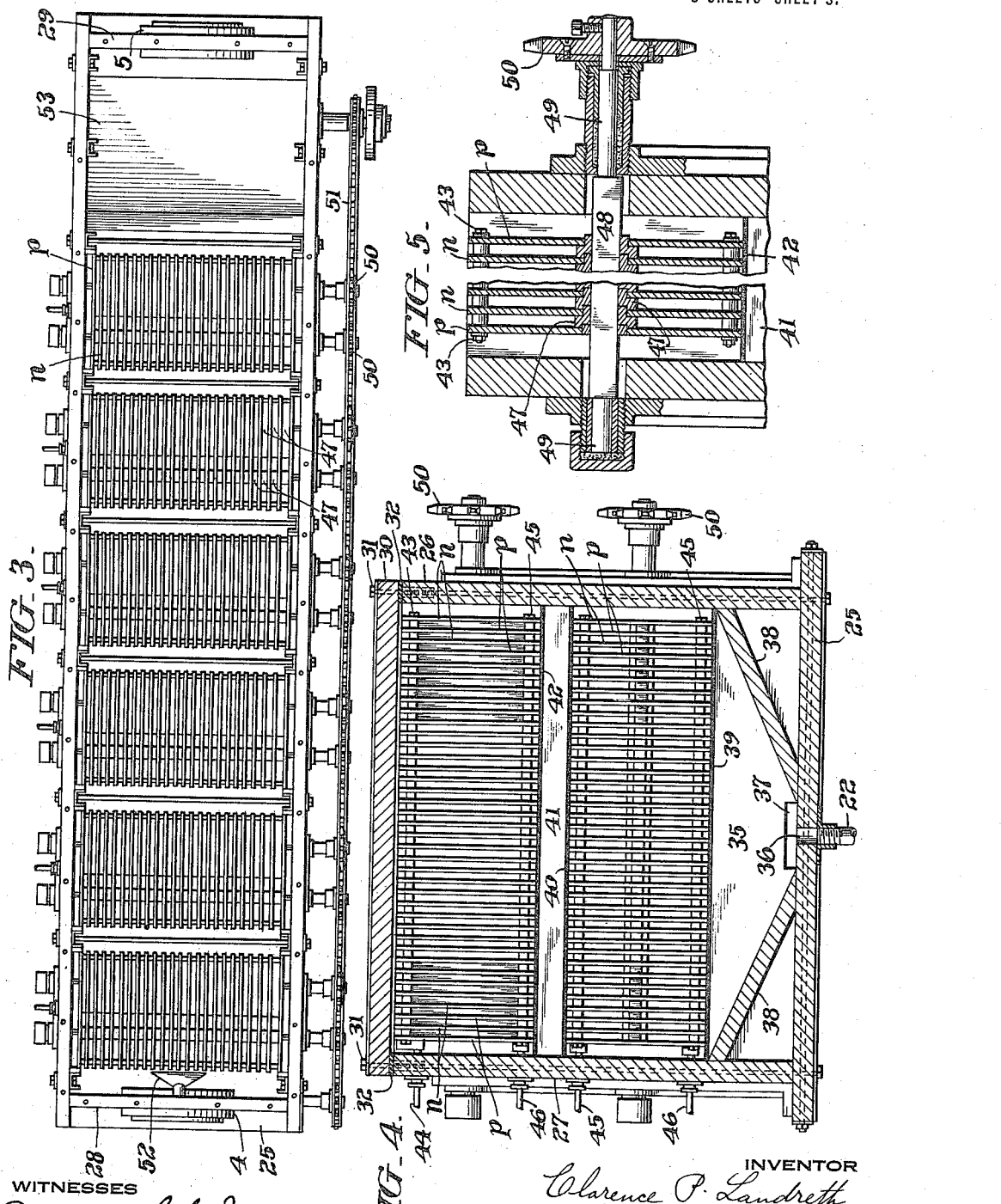

UNITED STATES PATENT OFFICE.

CLARENCE P. LANDRETH, OF PHILADELPHIA, PENNSYLVANIA.

ELECTROCHEMICAL PROCESS OF TREATING WATERS, LIQUIDS, AND SEWAGE.

1,139,778.   Specification of Letters Patent.   Patented May 18, 1915.

Application filed October 12, 1914. Serial No. 866,198.

*To all whom it may concern:*

Be it known that I, CLARENCE P. LANDRETH, a citizen of the United States, residing in the city of Philadelphia, county of Philadelphia, and State of Pennsylvania, have invented certain new and useful Improvements in Electrochemical Processes of Treating Waters, Liquids, and Sewage, of which the following is a specification.

My invention relates to electro-chemical treatment of waters, sewage, factory waste, effluent from tanneries and slaughter houses, and in fact liquids in general, for the purpose of purifying the same or producing therein desired chemical or physical changes, or both.

My invention resides in the treatment of liquids, such as river or other waters for drinking or industrial purposes, contaminated by organic matter (germs, coloring matter, stain, etc., all generally organic), or waters containing oxidizable inorganic matter therein, in virtue of introduction into the liquid of calcium hydroxid, sodium hydroxid, potassium hydroxid, or any other equivalent or suitable chemical which will increase the hydroxyl concentration within the liquid, that is, a material of such nature added in such quantity that during at least some part of the electrical treatment the liquid will contain in solution free alkali to at least such degree as shown by any suitable indicator, and nascent oxygen will be produced which will cause oxidation of organic or oxidizable inorganic matter suspended or dissolved in the liquid or water; and by preference such material is added to the liquid or water in such quantity that the free alkalinity exists after the electrical treatment, that is, the effluent contains free alkali to at least such degree as indicated by any suitable indicator.

My invention resides also in the process of electrically treating sewage, effluents from tanneries, slaughter houses and the like, liquids containing putrescible material, or for the treatment of any liquid carrying organic or inorganic matter in solution or suspension which may be acted upon for procuring fertilizer values or for producing other effects; and my invention is directed particularly to the electrolytic or electro-chemical treatment of sewage for rendering the liquid effluent harmless, for rendering the sludge non-putrescent and of non-offensive odor, and for recovering a maximum of sludge or solids or semi-solids from the sewage, which shall have improved fertilizer value.

In the heretofore commonly practised septic tank process of treatment of sewage, the development and action of anaërobic bacteria is essential and availed of in order to convert solids more or less completely into liquid, by the action of the bacteria, and so reduce the amount of remaining solids or sludge, which is of offensive odor and of little or no fertilizer value. The effluent, consisting of the liquid of the raw sewage and the aforementioned liquefied solids or sludge, is then subjected to the action of air and aerobic bacteria by aeration or otherwise, filtration, chemicals, or otherwise, after which the liquid effluent is discharged into a stream or water course. The solid matter or sludge remaining after the above-mentioned treatment is of less quantity than in the raw sewage and has little or no fertilizer value, and its value is lessened also because of its offensive odor, putrescibility and probable pathogenic bacterial content. Briefly, this method of sewage treatment requires a large storage capacity for the sewage while undergoing the liquefying action by the bacteria, requires filtering and aeration beds of large areas, and requires large chemical treating tanks, etc. By my process of sewage treatment, however, a far smaller plant is required and improved results both in effluent and in sludge are produced. The effluent is caused to contain increased dissolved oxygen, and, by preference, the effluent is caused to contain free alkali. And the resulting sludge is of inoffensive odor, and non-putrescent, and represents a relatively large part of the solids or sludge in the raw sewage.

Briefly, my process consists in adding to the raw sewage a material of such character and in such quantity as to cause it to contain free alkali at least at some stage of the electrical treatment, whereby nascent oxygen produces effects upon the oxidizable matter in the sewage such as to oxidize organic matter, cause destruction of the germs or bacteria in the sewage and render the sludge non-putrescent and of inoffensive odor and cause the effluent to contain dissolved oxygen. To these ends I take coarsely strained sewage and deliver it to an electrical treating apparatus, preferably breaking up the solids therein into a condition of fine subdivision as by mechanical agitation or beating during the electrical treatment. The sewage during electrical treatment has free alkali therein, due to the presence of suitable substance added thereto, and preferably at least to such degree as is shown by any suitable indicator. I admit with the raw sewage anywhere prior to the electrolytic treatment, either remotely or immediately before such treatment, or at any suitable stage during the electrical treatment, a substance yielding hydroxyl ions, thereby increasing the hydroxyl concentration of the liquid. Such substances include sodium hydroxid, potassium hydroxid, ammonium hydroxid, or the hydroxids of the alkaline earth metals, for example, calcium hydroxid, which is my preferred substance, or other substances containing or yielding the hydroxyl ions in such quantity as to cause the sewage during at least some period of the electrical treatment to contain free alkali; and by preference the quantity of free alkali is made such that the effluent will be alkaline to at least such degree as will be indicated by any suitable indicator. Even in those cases where the raw sewage shows alkalinity to certain indicators, which indicate alkalinity by combined alkali, that is, by salts which give alkaline indications, I add a substance such as above referred to to insure free alkali in the liquid. For determining the presence of free alkali, such as calcium hydroxid or other hydroxid in solution in the liquid or sewage, the well known method involving the use of phenolphthalein may be employed. Such method consists in titrating a sample of the liquid or sewage in the presence of phenolphthalein indicator with a dilute acid and noting the number of cubic centimeters of dilute acid required to cause the pink color of the phenolphthalein, due to either free or combined alkali, to disappear. Then in the presence of methyl-orange the sample is further titrated with the same dilute acid until the color of the methyl-orange changes and the number of cubic centimeters of dilute acid noted. If the number of cubic centimeters of dilute acid used in titrating in the presence of phenolphthalein indicator exceeds the number of cubic centimeters of dilute acid used in titrating in the presence of methyl-orange, the liquid or sewage contains free alkali in quantity proportional to the excess of acid used in the presence of phenolphthalein over the amount of acid used in the presence of methyl-orange. This method of test is delicate and serves the purpose, though any other indicator may be employed. And irrespective of the indicator employed a principal feature of my invention resides, as stated, in the employment during the electrical treatment of free alkali in the liquid or sewage.

The free alkali used in the electrical treatment of liquids, is of importance because of the yield of nascent oxygen under the influence of the electric current, the nascent oxygen resulting from the breaking up of the alkali into its metal and OH or hydroxyl ions, the latter appearing at the positive electrode, and these hydroxyl ions unite to produce water, $H_2O$, and O, nascent or atomic oxygen. The metal of the alkali immediately recombines with water present to produce alkali or hydroxid of the metal which is then again broken up with resultant formation of water and nascent oxygen, this operation being cyclic or repeated, the quantity of nascent oxygen produced in a unit of time depending upon the strength of the current.

With regard to the treatment of liquids generally, including both waters and sewage, I may preliminarily treat such liquid in the presence of non-attackable electrodes, as of carbon or platinum, to produce nascent oxygen, or I may produce hyperchlorites and oxygen from the sodium chlorid or other chlorids or other salts containing the chlorin atom in the raw liquid or added thereto, such hyperchlorites produced acting as a germicide or a decolorizing or bleaching agent. Thereafter the liquid may have further electrical treatment, when containing free alkali, in the presence of positive electrodes which may be either unattackable, as of carbon or platinum, or in the presence of normally attackable metal electrodes, such as iron or copper, the alkali being introduced into the liqiud at any suitable stage after the above-mentioned preliminary treatment, and preferably immediately thereafter, for the production of nascent oxygen, coagulation, etc., by the effects of electric current, as herein described. For this treatment positive electrodes of iron or iron compounds, such as steel, are preferably used since they do not readily disintegrate under the mechanical wear and are readily and cheaply obtained, and because of their obvious mechanical and electrical advantages, and since, under conditions hereinafter named, they will not waste away under the electrical treatment, or if they are caused to waste away for hydroxid production, are readily and cheaply replaced. Or the liquid may have its first treatment in the presence of normally attackable positive electrodes, such as iron electrodes, while containing the calcium hydroxid or other substance above referred to in such quantity as to cause free alkali in the liquid, though the calcium hydroxid or other substance be present only in such quantity that by its subsequent reaction with carbon dioxid or carbonic acid in the water or sewage, or with soluble carbonates in the water or sewage, and with urine in the sewage, etc., it is used up or neutralized so that the liquid loses its free alkalinity and becomes neutral or substantially so. After such treatment the now substantially neutral liquid may be electrically treated in the presence of carbon or other unattackable electrodes. The liquid is now neutral and has no free alkali in it, and a greater current density may be employed at the carbon electrodes than at the first named metal electrodes, and hyperchlorite and oxygen will be produced from the ionizable chlorids in the liquid or added thereto, thus producing germicidal action, and bleaching or decolorizing action and oxidizing effects, and the effluent does not contain free alkali. In other words, the first electrical treatment of the liquid may be in the presence of either attackable or unattackable positive electrodes while containing free alkali which causes production of nascent oxygen, but which is used up in reacting with certain contents of the liquid so that the effluent no longer contains free alkali, and any hyperchlorite or oxygen action desired may be produced from ionizable salts in or added to the liquid, by the second electrical treatment. Separate banks of electrodes permit these variations in a single electrolyzing unit. In general, however, for any of the liquids treated, including waters and sewage, free alkali in the effluent is an advantage in that sedimentation is more rapid, particularly the sedimentation of all flocculants and the suspended matter carried down thereby, and this is particularly true when the flocculant is iron hydroxid produced as hereinafter described.

I may also treat liquids, such as waters and sewage, by subjecting the same to the effects of a germicide, such as chlorin gas or a hypochlorite, or a permanganate, or other substances, added thereto, to destroy the germs and bacteria, and pass through the liquid an electric current for causing stimulation for any of the following purposes: first, to cause a coagulation of colloidal or other matter in suspension, the liquid being sufficiently conductive for the purpose; or, second, by introducting into the liquid a substance of such character and in such quantity as to react with contents of the liquid, such as carbon dioxid, carbonic acid, or soluble carbonates, or organic matter, forming therewith a precipitate or insoluble compound, to rapidly produce a flocculant which will quickly sedimentize sludge or other suspended matter; or, third, in the presence of a positive electrode of metal producing, as herein described, hydroxid of the electrode metal to form a floc; or, fourth, to add a material of such nature and such quantity as to insure in the liquid free alkali which material will also react with contents of the liquid, such as referred to, to produce a flocculant and precipitate, and the effluent may be alkaline so as to hasten sedimentation; or, fifth, nascent oxygen may be produced in addition to the production of flocculant by the added material as herein described; all these variations being utilizable with the application of a germicide, of the character referred to, which germicide is preferably introduced into the liquid before the electrical treatment, though it may be introduced during the electrical treatment or after the electrical treatment. The chlorin gas or other germicide may be contained in water when introduced into the liquid or sewage treated.

In the treatment of sewage, I may introduce calcium hydroxid or other material which will react with contents of the sewage to produce insoluble compounds, and agitate the sewage during the reaction to hasten it and render it more complete; and with such last named treatment, in which no electric current is used, I may have recourse to the further step by subjecting the sewage to a germicide, as hypochlorite, chlorin gas, permanganate, or other germicides, which may be added to the sewage either before, during or after the agitation and reaction referred to. And in these cases it will be noted also that the agitation may be of such nature as to mechanically subdivide the solids or semisolids in the sewage which insures more rapid reaction and more rapid germicidal action.

The presence of carbon dioxid or carbonic acid in liquids, such as river and other waters, causes rusting or attack upon iron water pipes and other metals with which such liquids or waters come into contact. Sewage also contains carbon dioxid or carbonic acid and the older and more septic the sewage, the greater is this content. I avail myself of the presence of this content either in waters or sewage to produce a flocculant which serves to carry down suspended matter and assists in filtration, and in the case of liquids or waters produces the additional desired effect of preventing attack upon metals with which the liquids or waters may come into contact because of removal of this content. To these ends I introduce into the liquid or sewage a material, such as calcium hydroxid, which, upon passage of current therethrough, and preferably during agitation, will rapidly react with the carbon dioxid or carbonic acid to produce the insoluble compounds or flocculant; and such conversion of the carbon dioxid or carbonic acid has a further beneficial effect in that, when metal electrodes are used, these electrodes are saved from attack to which they would otherwise be subject if this content were not removed, and the further beneficial effect in that the flocculant is produced without having recourse to its production by wasting of the metal electrodes, and at a low cost, because no current energy need be expended for production of flocculant from the electrode material, where only small amounts of flocculant are required, and the cost is principally reduced because in this process the reagent is comparatively inexpensive, the cost of such reagent and current being less than the cost of electrode material. And for the treatment of liquids in general, such as waters and sewage, and particularly in the case of sewage, treatment may be effected without recourse to electric current by subjecting the same to the effects of a germicide added thereto, and agitating the same, either before, during or after the addition of a germicide, in the presence of calcium hydroxid or other suitable substance which will react with contents of the liquid or sewage to form insoluble compounds of the character above referred to.

With this general outline of my process reference may now be had, for an example of one of many ways of carrying it out, to the accompanying drawings, in which:

Figure 1 is a general view, partly in vertical section and partly in elevation, of apparatus whereby my process may be carried out. Fig. 2 is a side elevational view, some parts in section, of apparatus similar to that shown in Fig. 1, but shown in greater detail. Fig. 3 is a top plan view of the electrolyzer, with cover removed, the same being one of many suitable forms of electrolyzers which may be used for carrying out my process. Fig. 4 is a cross sectional view, on larger scale, through the apparatus shown in Fig. 3. Fig. 5 is a fragmentary vertical cross section, on still larger scale, showing parts in the electrolyzer. Fig. 6 is a diagrammatic view illustrating one of many circuit arrangements which may be used for the electrolyzer.

Referring to Fig. 1, S is the pipe or other conduit delivering raw liquid, water, sewage, or the like to the receiving tank or well W serving as a preliminary settling tank in which mud, sand or objects carried by the received liquid settle out by gravity. Connecting with the well W, preferably at a substantial distance above its bottom, is a pipe 3 across whose opening into the well W may be placed a strainer 3$^a$ for coarsely straining the liquid to prevent any large objects passing into the electrolyzer or electrolytic treating apparatus E with which the pipe 3 connects at 4. The liquid passes through the electrolytic treating apparatus and leaves it at 5 through the pipe 6 which may deliver into the settling chamber or tank T, in which suspended matter, such as the sludge of sewage, coagulant, or other matter in suspension in the treated liquid may settle and collect at the bottom, the substantially clear liquid or effluent passing out from near the top of tank T and through the pipe 7 to a stream $s$, if the effluent is not to be used, or if it is to be used the pipe 7 conducts it to the point of its utilization. It then may be passed through filters to remove the lighter suspended matter.

From the bottom of the tank T the pipe 8$^b$, controlled by valve 8$^c$ siphons the sediment or sludge from the tank T into the apparatus P which may be a filter press, or any other suitable sediment or sludge drying apparatus when desired, that is, apparatus for extracting liquid from the sediment or sludge; or P may represent any suitable filter beds or any other means for separating liquid from the solids, if such are required.

It will be noted that in the layout of Fig. 1 the liquid passes throughout its course by gravity.

R is a reagent tank, containing the milk of lime or any other substance herein referred to, the same being delivered through pipe 15 and thence through any or all of the pipes 16, 18, 20 controlled, respectively, by the valves 17, 19 and 21.

Referring to Fig. 2 the layout is similar to that of Fig. 1 in that the liquid passes throughout its course of treatment by gravity, though it will be understood with respect to both Figs. 1 and 2, a pump may be employed at any point where it is desired or necessary to force the flow of liquid.

In Fig. 2 parts similar to those in Fig. 1 are indicated by like reference characters. In this case, however, from the bottom of the tank T the pipe 8, controlled by valve 8$^a$, conveys the sediment or sludge to the filter press or drying apparatus P from which the separated liquid passes through pipes 9 and 11 and valve 12 to the pipe 7 where it may pass off through pipe 7 with the effluent.

There communicates with the pipe 1 a pipe 13, controlled by valve 14, leading to the filter press P to which the coarse objects, sediment, sand, etc., collected in the bottom of the well W will be carried through the pipes 1 and 13 to separator P to have liquid separated therefrom when so desired, so that this solid matter may be carried away with the sludge or other solids separated by the device P and received from tank T. For this operation the valves 8$^a$ and 12 may be closed, and the valve 10 opened, whereupon the extracted untreated liquid is returned to the pipe 1 to mingle with the raw liquid and to be later treated with it. Any sediment, such as sand, precipitate, etc., which collects in the bottom of the apparatus E may be drawn off through the pipes 22, controlled by the valves 23, communicating with the pipe 24 which leads back into the receiving well W from which the mud, sand, or sediment delivered through the pipe 24 may be drawn off through pipe 1 with the other matter collected in the well W, either through the valve 2 to waste, or through pipe 13 to the press P.

Referring now to Figs. 2 to 5 inclusive, E is the electrolytic treating chamber or tank, preferably of wood, though concrete or any other suitable material may be employed, comprising the bottom 25, sides 26 and 27, ends 28 and 29, and top or cover 30 which may be secured to the sides 26 and 27 by bolts 31, packing or gaskets 32 intervening between them to make a gas and liquid tight joint, though it will be understood that my invention is not limited to the employment of an electrolyzer which is so closed against the atmosphere, for it is within my invention to use electrolyzers which are open to the atmosphere.

Resting upon the bottom 25 and extending transversely of the tank E are the timbers or members 35 between pairs of which pipes 22 connect at the openings 36, alternate members 35 having in their lower edges the openings 37, through which mud, sand, or precipitate may pass to an opening 36. And disposed between the members 35 are the timbers or plates 38 extending from the upper edges of the members 35 downwardly to the edges of the openings 37, these members 38 serving to guide sediment to the openings 36 and 37. Upon the upper edges of the members 35 are strips of insulating material 39 upon which rest at their lower edges the lower banks of positive and negative electrode plates $p$ and $n$, these electrodes having their faces vertical, though they may be otherwise disposed. Upon the upper edges of the lower electrodes are disposed strips of insulating material 40 upon which rest the transverse timbers or strips 41 upon which are disposed the strips of insulating material 42 upon which the upper banks of positive and negative electrodes $p$ and $n$ rest at their lower edges. The positive and negative electrodes of a bank preferably alternate, and all the positive electrodes of a set are connected together by conducting bolts 43 terminating in conducting studs or terminals 44, while the negative electrodes are connected together by conducting bolts 45 which terminate in conducting studs or terminals 46. The conducting studs or terminals 46 extend through the wall 27 and have a liquid tight connection therewith. Between the electrodes are disposed paddles 47 driven by shafts 48 having bearings at 49 in stuffing boxes, the shaft being driven by sprocket wheels 50 which are in turn driven by the sprocket chain 51 driven by any suitable source of power such as an electric motor, so that all paddles are simultaneously rotated, the paddles for each bank being preferably disposed at right angles to each other, as indicated in Fig. angles to each other, and the coresopnding paddles of upper and lower banks being preferably disposed at right angles to each other, as indicated in Fig. 2. Paddles or other members having other than rotary movement may be employed. The liquid enters through the end 28 from the pipe 3 and encounters the baffle 52 which spreads the liquid laterally to cause it to flow uniformly with respect to all the electrodes; after having traversed the electrodes the liquid encounters the downwardly extending baffle 53 around whose lower edge the liquid passes through the outlet at 5 to the pipe 6.

The above described structure of the electrolyzer is claimed in my co-pending application Serial Number 866,559.

The liquid traversing the electrolyzer is thoroughly agitated by the paddles so that it is thoroughly contacted with any nascent oxygen or other product of electrolytic action or any chemical which is to act upon it; and these paddles prevent any sediment or precipitate adhering to the electrode plates; and, as in the case of sewage, these paddles serve to finely divide and break up the solids or semi-solids so that the oxidation or other treatment may be thorough and complete and to keep the electrodes from clogging. While the solids or semi-solids may be subdivided within the electrolyzer, it will be understood that they may be previously broken up or subdivided by any suitable means, or by a centrifugal or other pump which may be used in delivering the material to the treating apparatus.

The electrodes may be connected in circuit in any suitable way, the banks of electrodes being generally connected in series with each other, though they may be connected in parallel with each other, or in any series-parallel arrangement, or be constructed as one electrode bank.

Fig. 6 shows the banks of electrodes connected in series with each other in the circuit of any suitable source of current, such as a direct current generator G having the field winding $f$ controlled by the adjustable resistance $r$, an adjustable resistance $r'$ being connected in the circuit of the electrodes if desired. Variation of either of the resistance $r$, $r'$, or both, will cause a variation of the current strength passed through the liquid between the electrodes, this variation of current being desirable to the end of varying the current density with relation to alkalinity of the liquid as hereinafter described, and other variations of treatment desired.

The operation will now be described at length for the treatment of sewage specifically: The raw sewage is received through pipe S in the receiving well W where any coarse or heavy objects in the sewage will settle to the bottom, together with mud, sand, silt, etc. The sewage is coarsely strained by the screen 3ª and passes into the electrolyzer E in which the electrodes $p$ and $n$ will first be assumed to be of iron or mild steel or other metal or alloy, all of which would be attacked, in normal sewage, upon passage of electric current, to form hydroxid of the metal of the positive electrodes. But the sewage treated is not in its normal state, but has admixed therewith calcium hydroxid, or other suitable substance, of such character and in such quantity as to cause the sewage to contain free alkali. Raw sewage is generally acid and septic, particularly after it is several hours old, as it will ordinarily be because of the time consumed in passing through the sewer system of a city or the like. But even such sewage is sometimes stated to be alkaline, but reference is had to combined alkali, and not free alkali. In my process, however, I refer to free alkali in the sewage caused by the addition of the calcium hydroxid or other substance, raw sewage containing free alkali only in rare instances and then only transiently because of some sudden outpouring into the sewage system of alkali from factory waste or other sources.

The calcium hydroxid or other substance is provided in the reagent tank R and may be introduced into the raw sewage through pipe 16 into the well W, or through pipe 18 just as the sewage enters the electrolyzer E; or it may be introduced through both of these pipes and in addition through the pipe 20, though the pipe 20 is generally used under circumstances hereinafter described. The sewage now having therein free alkali passes between the electrodes, simultaneously encountering the paddles which finely divide or break up the solids or semi-solids or sludge. The current passes through the alkaline sewage and nascent oxygen is liberated at the positive electrodes $p$, and this nascent oxygen as such and molecular action resulting therefrom, oxidize the sewage content, destroying the bacteria or germs, and also oxidizing the sludge or solids and semi-solids, rendering the same non-putrescent and of inoffensive odor. In consequence the germs or bacteria are practically completely destroyed, and the sludge is non-putrescent, of inoffensive odor, is stable, and has a value as fertilizer, as for land.

The raw sewage contains carbon dioxid or carbonic acid and soluble carbonates, and with these the calcium hydroxid or other similarly acting substance admixed reacts immediately and rapidly under the stimulus of the electric current to form insoluble carbonates, such as hydrated calcium carbonate, which is a flocculant which hastens precipitation and flocculation or coagulation of sludge or other matter in suspension in the liquid when the treated liquid and sludge reach the tank T. Furthermore, the calcium hydroxid or other substance added has a beneficial result in that organic matter in solution in the sewage is also precipitated. In the tank T such precipitate, the sludge and other matters in suspension sedimentize, the sedimentation being assisted by the flocculant produced by the calcium hydroxid or other suitable substance introduced reacting with the sewage content. The clear effluent passes from the tank T through the pipe 7 and is now harmless and may be discharged into a stream without polluting effects.

The degree of alkalinity of the sewage is preferably made such that, with the current strength used, there will be no attack upon the positive metal electrodes, so that no or substantially, no hydroxid of the positive electrode metal will be formed. Such hydroxid, as iron hydroxid, is, however, valuable as a flocculant, particularly in water treatment, and may be produced, with a given degree of alkalinity of the water or sewage, by simply increasing the current strength passed through the liquid, as by increasing the current density at the electrodes, as by diminishing either of the resistances $r$ or $r'$ or both, Fig. 6. Or where a given current strength or current density is desired, the same may be used without producing hydroxid of the positive electrode metal by suitably increasing the degree of alkalinity of the sewage. In other words, the production of hydroxid of the positive electrode metal is dependent upon relation of degree of alkalinity and current strength or density. And either the current strength or alkalinity, or both, may be varied to produce or not produce such hydroxid at will. A simple mode of manipulation is to observe a sample of the liquid discharged from the pipe 6. If the hydroxid floc is present, the operator may prevent its formation either by increasing the alkalinity or by decreasing the current strength or density. Or if he finds from the sample that no floc is produced, and floc is desired, he may either decrease the degree of alkalinity or he may increase the current strength or density.

When the hydroxid floc of the positive electrode metal is formed it assists in the precipitation or sedimentation in tank T of all matter in suspension in the sewage. Ordinarily, however, the floc produced by the reaction of the calcium hydroxid or other substance added with contents of the sewage is sufficient for the sedimentation in tank T and the current strength and alkalinity will therefore generally be such that the nascent oxygen is produced, as described, with no or substantially no attack upon the positive metal electrodes. It will be understood, however, that where the hydroxid floc of the positive electrode metal is formed, nascent oxygen is simultaneously formed when free alkali is present so that the oxidation above described takes place and besides flocculant from the positive electrode is produced for assisting the sedimentation. Or where floc from the electrodes is desired, as in water treatment, the alkali may be added subsequent to the production of hydroxid from the electrodes. The alkali may be added prior to one or more of the banks of electrodes and thus produce oxygen to oxidize the hydroxid to a higher state of oxidation, as for instance, ferrous hydroxid to the ferric hydroxid. Furthermore, particularly with sewage treatment, it is desirable to have such degree of alkalinity, by free alkali, in the sewage that after having traversed the electrolyzer, the liquid has free alkali therein. Such alkalinity of the liquid is of advantage in that sedimentation in the tank T is more rapid and complete than when the liquid is not alkaline, and particularly when iron hydroxid floc is produced. However, it is within my invention to add to the sewage a material of such nature and in such quantity as to cause therein free alkali so that nascent oxygen may be produced, as above described, but which may be more or less completely used up in reacting with contents of the sewage, as above described, so that the liquid leaving the electrolyzer may be substantially neutral.

While in the above treatment I have referred to the electrodes as being of metal, such as iron or mild steel plates, it will be understood that carbon or other normally unattackable electrodes may be employed, for with electrodes of such material the free alkalinity insures the production of nascent oxygen and the other effects above referred to, except the production of hydroxid floc from the positive electrode material. Furthermore, in the above described process, in which oxidation is produced, nitrites in the sewage are converted into nitrates. And the nascent hydrogen formed at the negative electrodes assists in the formation with nitrogen of ammonium or nitrogen compounds, such as nitrates, ammonia, etc., which with similar compounds present are partly retained in the sludge and give the sludge further fertilizer value. Ammonia so produced from union of nascent hydrogen with nitrogen forms with water ammonium hydroxid which, as in case of calcium hydroxid, will yield nascent oxygen at the positive electrode as result of decomposition by the current into ammonia and OH ions. And the oxygen and free alkali also prevent or destroy putrefactive action in the sludge. And the production of oxygen by the process above described insures not only the oxidation of sewage content as described, but saves any dissolved oxygen in the sewage, thus maintaining in the sewage liquid its dissolved oxygen, and actually increasing, if desired, the amount of dissolved oxygen, so that the effluent contains ample dissolved oxygen. Furthermore, when the free alkali in the sewage is produced by the hydroxid of a metal which has great affinity for water, as calcium, potassium or sodium, during the cyclic decomposition and reformation of the hydroxid of such metal, during the electrical treatment above described, nascent oxygen is formed at the positive electrode, as stated, and at some instants the metal, as calcium potassium or sodium, is nascent and free at the negative electrode, and having great affinity for water as stated, will extract water from anything with which it may at the instant be in contact, and accordingly, such metal may extract the water from, and in so doing destroy, protoplasms, bacteria, germs, etc. in the liquid or sewage. And that such action takes place is indicated from the fact that the extent of bacteria and germ destruction attained by the practice of my process is even greater than that which can be accounted for from the effects of the oxygen and other reactions taking place at the positive electrodes.

The nature of the negative electrodes for the practice of my process is in general a matter of indifference, but because of suitability, iron electrodes may be used when the positive electrodes are either metal or carbon.

The sludge or sediment in the tank T may be conveyed to the device P where the liquid is extracted, and this liquid, being harmless and being in fact the same as the effluent in pipe 7, may be discharged through pipe 7 through pipes 9 and 11.

When it is desired to dispose of the solid matter collecting in the receiving well W with the sludge extracted from the liquid or sewage, the same may be conveyed to the device P through pipes 1 and 13, in which case the liquid extracted will be untreated raw liquid and the same may be returned to the pipe 1, for treatment, through the pipe 9 and valve 10, in such case the valve 12 being closed. The effluent passing off through pipe 7 is harmless and contains excess or ample oxygen as described, and may accordingly be discharged into a stream or water course without contaminating it.

When separation of the sludge from the liquid is not desired, the treated sewage may be discharged directly to waste through valve $8^e$ instead of into tank T.

The sludge recovered has a decided fertilizer value, which is due in part to the lime and nitrogen compounds, or other compounds therein formed, such as the retained ammonia or ammonium compounds, nitrites, nitrates, etc. The value of the sludge is further increased from the fact that it has no offensive odor and is not putrescent.

The positive electrodes need not all be attackable or non-attackable. Part of them may be unattackable, as of carbon, while the remainder may be normally attackable, as of iron, copper or other metal, or alloy. Thus the positive electrodes with which the sewage first comes into treating relation may be unattackable, as of carbon, while the electrodes with which the sewage comes later into treating relation may be normally attackable, as of iron. There being generally sodium chlorid present in the sewage, the action is such, in the presence of carbon or other unattackable electrodes, that a hypochlorite is formed, which acts in the well known manner as a germicide. Or if the sewage lacks sufficient sodium chlorid or other ionizable salt the same or equivalent salt may be introduced into the sewage for the same purpose, as into tank W or pipe 3. After this preliminary treatment for hypochlorite production I may then introduce the alkaline substance, such as calcium hydroxid, into the sewage preferably immediately after its treatment in the presence of unattackable electrodes or at any suitable later stage of current treatment, as by opening the valve 21 and conducting the calcium hydroxid into the tank E through pipe 20 at a point beyond the first electrodes, with the result that in the presence of the normally attackable electrodes, as of iron, nascent oxygen, or nascent oxygen and flocculant, etc., are produced as hereinbefore described. Or the positive electrodes with which the sewage comes first into treating relation may be of iron or other normally attackable metal, and just enough calcium hydroxid or other substance added that enough free alkali will be present in the sewage to produce nascent oxygen before complete neutralization, either with or without production of hydroxid of the positive electrode metal, as previously described, and to be substantially completely used up in reacting with the carbon dioxid or carbonic acid, soluble carbonates, dissolved organic matter, etc. Then the sewage is substantially neutral and may then come into treating relation with unattackable or carbon electrodes where, because of sodium chlorid or other ionizable salt present in the raw liquid or added thereto, produces a hypochlorite and oxygen for germicidal and other purposes, as previously referred to. And in such case the current density at the carbon or unattackable electrodes may be made greater than on the iron or other normally attackable electrodes with which the sewage comes first into treating relation. And in this case the liquid leaves the electrolyzer in a substantially neutral condition.

The sludge recovered from the sewage by the process hereinbefore described may be treated with reagents, such, for example, as sulfuric acid, acid phosphates, etc., to convert calcium and other compounds and other material in the sludge into compounds having still greater fertilizer values, and to fix ammonium and nitrogen compounds, which also have fertilizer value. And the alkali added to the sewage for electrical treatment may at least in part be recovered by calcining, burning or roasting the sludge. For example, where calcium hydroxid has been added to the sewage calcium oxid may be produced by burning or roasting the sludge. This calcium oxid is then readily converted to the hydroxid state by the addition of water in the well known method of slaking lime.

A convenient method of providing and adding calcium hydroxid to the sewage, as hereinbefore referred to, consists in mixing calcium oxid, commonly called lime, with water, which latter may be in such small quantity that milk of lime is produced, which milk of lime is added to the sewage at any of the points hereinbefore referred to, and, coming into the presence of ample liquid or water, becomes calcium hydroxid.

While I have above described the process of treating sewage, it will be understood that the same steps of method may be practised in the treating of liquids in general containing oxidizable organic or inorganic material in suspension or solution. And in the treatment of waters, the germs or bacteria, coloring matter, stain, etc. will be similarly acted upon by the oxygen or hypochlorite. But while it is my preference in the treatment of sewage to prevent production of hydroxid of the positive electrode metal, in the case of water treatment I prefer to produce some such floc because some is generally needed to assist in carrying down any suspended matter or precipitate. And in the case of water treatment the effluent may have free alkali therein, or it may be delivered substantially neutral as described in connection with the treatment of sewage and the effluent may be caused to contain dissolved oxygen as above described.

My process of treating liquid, waters, sewage, etc., as hereinbefore described, by causing the same to contain free alkali so that oxygen is produced without substantial attack upon the positive metal electrodes, by producing hydroxid from those electrodes, is sharply contrasted with prior attempted or proposed electrolytic treatment of liquids in the presence of metal or iron electrodes because such electrodes wasted rapidly in the formation of iron hydroxid or hydroxid of the positive electrode metal without substantial direct production of oxygen and with materially greater consumption of electric energy. By my process, liquids, such as sewage or waters, may be thoroughly treated at reasonable cost, the lowering of the cost over prior attempted or practised methods being due to the fact that the current consumption is relatively low, both in that hydroxid of the positive metal in sewage treatment is in general not required, and from the fact that the liquid treated comes into contact with great amount of electrode surface and agitation, as by the paddles, efficiently uses what oxygen is produced and causes an intimate contact between the liquid and the electrodes.

While the addition of calcium hydroxid or similar substance to waters for electrical treatment produces the oxidation and other effects above referred to, it produces beneficial effects also in softening the water, that is, by precipitating from it incrustating salts which are in solution in it; and colloidal matter is also advantageously removed, but these processes of softening water and removing colloidal matter are not herein claimed, the same being claimed in my co-pending application Serial Number 837,887, filed May 11, 1914.

Between the delivery pipe S and the well W may intervene a screen a which may collect any very large objects or masses in the delivered liquid or sewage.

It will be understood that the raw liquid or sewage may be delivered directly into the electrolyzer E through pipe 3 without first passing through the tank W; and that the treated liquid or sewage may be discharged from the electrolyzer E directly to waste or other suitable point through the valve 8$^e$, without first passing to the tank T; and that the contents of the tank T may be directly discharged to waste or other suitable point through the valve 8$^d$ without passing to the device P.

For procuring different current densities at different sets or banks of electrodes, particularly where all the banks or sets are connected in series with each other as illustrated in Fig. 6, the area of the electrode or electrodes of a set of bank exposed to the liquid may be different from that of another electrode, or set or bank of electrodes. In Fig. 6 this is indicated diagrammatically by having in one group or bank a less number of electrodes than in the other groups, or banks. And such arrangement may be availed of in the case hereinbefore described where, in some cases, the current density on the positive carbon electrodes is higher than on the positive metal electrodes. And in this connection it will be understood that different current densities on different electrodes may be otherwise procured, as by having separate circuits and generators for the different sets of electrodes.

In the cases where a material or reagent is to be added to the liquid or sewage under treatment after it has undergone the electrical treatment or agitation it will be understood that such material or reagent may be introduced either from the tank R by a suitable valve controlled pipe opening into the tank E at some point to the right of the electrodes, as viewed in Fig. 2, or from any separate container or tank which may communicate through such a valve controlled pipe with the interior of the tank E to the right of the electrodes or at any other suitable point in the system.

This application is in part a continuation of my application Serial Number 844,103, filed June 9, 1914, which is in part a continuation of my application Serial Number 804,796, filed December 5, 1913, and in part a division, pursuant to Patent Office requirement, from my application Serial Number 837,887, filed May 11, 1914, which is in turn in part a continuation of my application Serial Number 749,764, filed February 21, 1913.

What I claim is:

1. The method of treating sewage or liquid containing putrescible material, which consists in adding thereto a material of such character and in such quantity as to insure free alkali in the liquid, passing electric current through the liquid to produce nascent oxygen, and subjecting putrescible material to the effects of nascent oxygen, whereby said material is rendered non-putrescent.

2. The method of treating sewage or liquid containing putrescible material, which consists in adding thereto a material of such character and in such quantity as to insure free alkali in the liquid, said added material and content of said liquid yielding a flocculant, and passing an electric current through said liquid, whereby putrescible material is subjected to the effects of resultant nascent oxygen and the liquid clarified by said flocculent, the effluent being alkaline.

3. The method of treating putrescible material, which consists in adding alkali to liquid containing said material in such quantity as to insure free alkali in the liquid, passing electric current through the liquid, whereby said material is subjected to the effects of resultant nascent oxygen, and thereafter separating the liquid from the solid content.

4. The method of treating putrescible material, which consists in adding to the liquid containing the putrescible material a material of such character and in such quantity as to insure free alkali in the liquid, and passing an electric current therethrough, whereby said putrescible material is subjected to the effects of resultant nascent oxygen, the liquid after the electric treatment containing free alkali.

5. The method of treating sewage or liquid containing putrescible material, which consists in adding thereto calcium hydroxid in such quantity as to insure free alkali in the liquid, and passing electric current through the liquid, whereby nascent oxygen is produced and the putrescible material rendered non-putrescent and the effluent caused to contain ample oxygen.

6. The method of treating sewage, which consists in adding thereto a material of such character and in such quantity as to insure free alkali therein, passing an electric current therethrough to produce nascent oxygen, and subjecting the sewage content to the effects of oxygen, whereby bacteria are destroyed and oxidizable matter is oxidized.

7. The process of treating sewage, which consists in adding thereto a material of such character and in such quantity as to both produce with a content of the sewage a flocculant and to insure free alkali in the sewage, and passing electric current therethrough, whereby nascent oxygen is produced, the effluent rendered harmless and suspended matter carried down by said flocculant.

8. The method of treating sewage, which consists in adding thereto a material of such character and in such quantity as to insure free alkali therein, and passing electric current therethrough, whereby nascent oxygen is produced, said free alkali in the sewage being of such quantity as to insure free alkali in the effluent after electrical treatment.

9. The method of treating sewage, which consists in adding thereto calcium hydroxid in such quantity as to insure free alkali therein, and passing electric current therethrough, whereby nascent oxygen is produced.

10. The method of treating sewage, which consists in adding thereto calcium hydroxid in such quantity as to insure free alkali therein, and passing electric current therethrough, whereby nascent oxygen is produced, said free alkali being present in such quantity that the effluent contains free alkali.

11. The process of treating sewage, which consists in adding thereto milk of lime in such quantity as to insure free alkali therein, and passing electric current therethrough, whereby nascent oxygen is produced.

12. The process of treating sewage, which consists in adding thereto milk of lime in such quantity as to insure free alkali therein, and passing electric current therethrough, whereby nascent oxygen is produced, said free alkali being present in such quantity that the effluent contains free alkali.

13. The method of treating sewage, which consists in adding thereto a material of such character and in such quantity as to insure free alkali therein, and passing an electric current therethrough to produce nascent oxygen to which the suspended matter of the sewage is subjected, whereby the sludge recovered is non-putrescible and without offensive odor.

14. The method of treating sewage, which consists in adding thereto a material of such character and in such quantity as to insure free alkali therein, and passing an electric current therethrough to produce nascent oxygen to which the suspended matter of the sewage is subjected, whereby the sludge recovered has greater fertilizer value than the solids in the raw sewage.

15. The method of treating sewage, which consists in adding thereto material of such character and in such quantity as to insure free hydroxyl content, and subjecting the same to the action of an electric current, whereby the hydroxyl ions are caused to unite and form water and nascent oxygen at the positive electrode.

16. The method of treating sewage, which consists in adding thereto a material of such character and in such quantity as to insure free alkali therein, and passing electric current of such strength therethrough in the presence of a positive metal electrode that nascent oxygen is produced without attack upon said positive metal electrode.

17. The method of treating sewage, which consists in adding thereto milk of lime in such quantity as to insure free alkali therein, and passing electric current of such strength therethrough in the presence of a positive iron electrode that nascent oxygen is formed without substantial wasting of said iron electrode.

18. The method or treating liquid or sewage, which consists in mechanically subdividing the solid content thereof and passing electric current through said sewage to produce nascent oxygen to which the sewage content is subjected, whereby the sewage solids are rendered non-putrescent and of fertilizer value.

19. The method of treating sewage, which consists in mechanically subdividing the solids therein, introducing an alkali, and passing electric current therethrough.

20. The method of treating sewage, which consists in adding an alkali thereto, passing electric current therethrough, and simultaneously with the passage of current mechanically subdividing the solids in said sewage.

21. The method of treating sewage, which consists in adding calcium hydroxid thereto, passing an electric current therethrough, and simultaneously with the passage of current mechanically subdividing the solids of said sewage.

22. The method of treating putrescible material, which consists in passing electric current through an alkaline liquid containing said material, separating the liquid from the solids after said treatment, and similarly re-treating more or less of the liquid so separated.

23. The method of treating putrescible material, which consists in passing electric current through an alkaline liquid containing said material, separating the liquid from the solids after said treatment, re-introducing more or less of the liquid so separated into alkaline liquid containing untreated putrescible material, and simultaneously treating said last named liquid.

24. The method of treating sewage, which consists in passing an electric current through an alkaline mass of sewage, separating the liquid from the solids after such treatment, and similarly re-treating more or less of the liquid so separated.

25. The method of treating sewage, which consists in passing an electric current through an alkaline mass of sewage, separating the liquid from the solids after such treatment, and re-introducing more or less of the liquid so separated into sewage about to be treated.

26. The method of treating sewage, which consists in adding thereto a material of such character and in such quantity as to insure free alkali therein, passing an electric current therethrough to produce nascent oxygen, thereafter separating the solids from the liquid, and chemically treating the separated solids to secure fixation of unstable compounds.

27. The method of treating sewage, which consists in adding thereto a material of such character and in such quantity as to insure free alkali therein, passing an electric current therethrough to produce nascent oxygen, thereafter separating the solids from the liquid, and chemically treating the separated solids to secure fixation of unstable compounds of nitrogen.

28. The method of treating sewage or liquid containing putrescible material, which consists in adding thereto material of such character and in such quantity as to insure free alkali in the liquid, passing electric current through the liquid, whereby oxygen is produced and the putrescible material rendered non-putrescent, and thereafter separating the solids from the liquid, the separated liquid being alkaline.

29. The method of treating sewage or liquid containing putrescible material, which consists in electrolyzing the same to produce hypochlorite from material in the raw sewage or liquid or added thereto, rendering the sewage or liquid alkaline, and passing electric current therethrough, whereby oxygen is liberated and acts upon the content of the sewage or liquid.

30. The method of treating sewage or liquid containing putrescible material, which consists in electrolyzing the same in the presence of an unattackable positive electrode, whereby hypochlorite is formed from material in the raw sewage or liquid or added thereto, causing the sewage or liquid to contain free alkali, and passing current therethrough in the presence of a positive electrode of metal, whereby oxygen is liberated and acts upon content of the sewage or liquid.

31. The process of treating sewage or liquid containing putrescible material, which consists in adding thereto material of such character and in such quantity as to insure free alkali therein, and passing electric current through the liquid or sewage, whereby hypochlorite is formed from material in the raw liquid or sewage or added thereto and oxygen liberated to act upon oxidizable content of said sewage or liquid.

32. The method of treating sewage or liquid containing putrescible material, which consists in electrolyzing the same to produce hypochlorite from material in the raw sewage or liquid or added thereto, rendering the sewage or liquid alkaline, and passing electric current therethrough, whereby oxygen is liberated and acts upon content of the sewage or liquid, the liquid after electrical treatment being alkaline.

33. The method of treating sewage or liquid containing putrescible material, which consists in preliminarily electrolyzing the same in the presence of an unattackable positive electrode, causing the sewage or liquid to contain free alkali, and passing current therethrough in the presence of a positive electrode of metal, whereby oxygen is liberated and acts upon the content of the sewage or liquid.

34. The method of treating sewage or liquid containing putrescible material, which consists in causing the same to flow in a stream or current isolated from the atmosphere, causing the sewage or liquid to contain free alkali, passing current therethrough and simultaneously agitating the same, whereby oxygen is liberated and acts upon the content of the sewage or liquid.

35. The method of treating liquid or sewage which in the raw state contains free carbon dioxid or carbonic acid, which consists in electrolyzing the same in the presence of a material of such character and such quantity added thereto as to form with the carbon dioxid or carbonic acid a carbonate and to insure free alkali in the liquid and to produce oxygen, whereby the effluent is substantially free of carbon dioxid or carbonic acid and contains free oxygen.

36. The method of treating liquid or sewage which in the raw state contains carbon dioxid or carbonic acid, which consists in electrolyzing the same in the presence of calcium hydroxid added thereto in such quantity as to produce an insoluble calcium carbonate and to insure free alkali in the liquid and to produce oxygen, whereby the effluent is substantially free of carbon dioxid or carbonic acid and contains free oxygen.

37. The method of treating liquid or sewage which in the raw state contains free carbon dioxid or carbonic acid, which consists in electrolyzing the same in the presence of a material of such character and such quantity added thereto as to form with the carbon dioxid or carbonic acid a corbonate and to insure free alkali in the liquid, whereby the effluent is substantially free of carbon dioxid or carbonic acid and is alkaline.

38. The method of treating liquid or sewage which in the raw state contains free carbon dioxid or carbonic acid, which consists in electrolyzing the same in the presence of a material of such character and such quantity added thereto as to form with the carbon dioxid or carbonic acid a carbonate and to insure free alkali in the liquid and to produce oxygen, whereby the effluent contains substantially no carbon dioxid or carbonic acid and contains free oxygen and is alkaline.

39. The method of treating liquid or sewage which in the raw state contains carbon dioxid or carbonic acid, which consists in electrolyzing the same in the presence of calcium hydroxid added thereto in such quantity as to produce an insoluble calcium carbonate and to insure free alkali in the liquid, whereby the effluent contains substantially no carbon dioxid or carbonic acid and is alkaline.

40. The process of treating liquid having oxidizable content, which consists in adding to the liquid a material of such nature and in such quantity as to cause the same to contain free alkali, passing electric current through the alkaline liquid, and subjecting the oxidizable content to resultant nascent oxygen.

41. The process of treating liquid having oxidizable organic content, which consists in adding to the liquid a material of such character and in such quantity as to cause the liquid to contain free alkali, passing electric current through the alkaline liquid, and subjecting the organic content to resultant nascent oxygen.

42. The process of treating liquid having oxidizable material in solution or suspension therein, which consists in adding to the liquid material of such character and in such quantity as to cause the same to contain free alkali, passing electric current through the alkaline liquid, and simultaneously agitating the liquid and the material in suspension therein to subject them to the resultant nascent oxygen.

43. The process of treating liquid having oxidizable content, which consists in adding to the liquid a material of such character and in such quantity as to cause the same to contain free alkali, passing electric current through the alkaline liquid in the presence of a positive electrode of metal, and subjecting said content to resultant oxygen.

44. The process of treating liquid having oxidizable content, which consists in adding to the liquid a material of such character and in such quantity as to cause the same to contain free alkali, passing electric current therethrough in the presence of a positive electrode of metal, the degree of alkalinity of said liquid and the current strength being such that substantially no hydroxid of the electrode material is formed, and subjecting the said content to resultant oxygen.

45. The process of treating liquid having oxidizable content, which consists in adding to the liquid a material of such character and in such quantity as to cause the same to contain free alkali, passing electric current therethrough in the presence of a positive electrode of metal, the degree of alkalinity of said liquid and the current strength being such that substantially no hydroxid of the electrode material is formed, and agitating the liquid to subject said content to resultant nascent oxygen.

46. The process of treating liquid having oxidizable material therein, which consists in adding thereto a hydroxid in quantity sufficient to cause the same to contain free alkali, and passing electric current through the alkaline liquid to cause hydroxyl ions to produce oxygen to which said material is subjected.

47. The process of treating liquid having oxidizable material therein, which consists in adding thereto a hydroxid, and passing electric current therethrough to cause hydroxyl ions to produce oxygen to which said material is subjected, said hydroxid being added in such quantity as to cause the liquid before and after electrical treatment to contain free alkali.

48. The process of treating liquid having oxidizable material therein, which consists in adding thereto material increasing the concentration of hydroxyl ions, and passing electric current therethrough in the presence of a positive electrode of metal to cause the hydroxyl ions to produce oxygen to which said oxidizable material is subjected, the hydroxyl concentration and the current strength being such that substantially no hydroxid of the electrode metal is formed.

49. The process of treating liquid having oxidizable material therein, which consists in adding thereto material increasing the concentration of hydroxyl ions, and passing electric current therethrough in the presence of a positive electrode of metal to cause the hydroxyl ions to produce oxygen to which said oxidizable material is subjected, the hydroxyl concentration and the current strength being such that substantially no hydroxid of the electrode metal is formed, said material being added in such quantity that the liquid after electrical treatment is alkaline.

50. The method of treating liquid or sewage, which consists in subjecting the same to a germicide added thereto, and passing an electric current through the liquid after, during or before addition of said germicide in the presence of a material of such nature added to the liquid in such quantity as to insure free alkali therein to produce oxidizing effects in addition to the effects of said germicide.

51. The method of treating liquids, which consists in subjecting the same to a germicide added thereto, and passing an electric current through the liquid after, during or before addition of said germicide in the presence of another material of such nature and in such quantity added thereto as to react with contents of the liquid to rapidly produce a flocculant.

52. The method of treating liquids, which consists in subjecting the same to a germicide added thereto, and passing an electric current therethrough after, during or before addition of said germicide in the presence of calcium hydroxid which reacts with contents of the liquid to rapidly produce a flocculant.

53. The method of treating liquids, which consists in subjecting the same to a germicide added thereto, and passing an electric current through the liquid after, during or before addition of said germicide in the presence of a material of such nature added thereto in such quantity as to react with contents of the liquid to rapidly produce a flocculant and render the effluent alkaline.

54. The method of treating liquid containing bacteria or germs, which consists in subjecting the same to a hypochlorite or free chlorin added thereto, and passing electric current therethrough to stimulate the germicidal action of said hypochlorite or free chlorin upon the germs or bacteria.

55. The method of treating liquids, which consists in passing electric current therethrough in the presence of an ionizable salt present in or added to the liquid and in the presence of a positive electrode of metal to produce a hydroxid of said metal, and passing electric current through liquid containing said hydroxid in the presence of a material which will yield oxygen directly or indirectly to oxidize said metal hydroxid to a hydroxid of higher degree of oxidation.

56. The method of treating liquids, which consists in passing electric current therethrough in the presence of an ionizable salt therein or added thereto and in the presence of a positive electrode of metal to produce a hydroxid of said metal which is more or less soluble, and thereafter subjecting said hydroxid to oxygen whereby it is oxidized to a hydroxid of higher degree of oxidation which is substantially insoluble.

57. The method of treating liquids, which consists in adding thereto a material of such nature and in such quantity as to insure free alkali therein, and passing electric current therethrough in the presence of a positive electrode of metal and a negative electrode incapable of alloying with the metal of said alkali, whereby the liberated metal of said alkali extracts water of combination of living organisms resulting in their destruction and the re-formation of hydroxid of said metal, the current strength and the degree of alkalinity of the liquid being such that substantially no hydroxid of the positive electrode metal is formed.

58. The method of treating liquid, which consists in passing electric current therethrough in the presence of a positive electrode of metal, said liquid having added thereto a material of such character and in such quantity that the liquid contains free alkali and under the stimulus of the electric current said material reacts with content of said liquid to produce a flocculant and leave free alkali in said liquid, the strength of said current and the degree of alkalinity of said liquid being such that substantially no flocculant is produced from the metal of the positive electrode.

59. The method of treating sewage, which consists in agitating the same independently of its flow and simultaneously passing current therethrough in the presence of a material of such nature added thereto as to rapidly produce with contents of the sewage a flocculant, and thereafter permitting said sewage to lie substantially quiescent to allow sedimentation.

60. The method of treating sewage, which consists in adding calcium hydroxid thereto, agitating the same and simultaneously passing current therethrough to cause said calcium hydroxid to react with contents of the sewage to produce a flocculant, and thereafter permitting said sewage to lie substantially quiescent to allow sedimentation.

61. The method of treating liquid or sewage, which consists in subjecting the same to the effects of a germicide added thereto, and agitating the same after, during or before addition of said germicide in the presence of a material of such character added thereto as to rapidly react with contents of the sewage to produce a flocculant.

62. The method of treating sewage, which consists in subjecting the same to the effects of a germicide added thereto, subdividing the solids and semi-solids therein and agitating the same after, during or before addition of said germicide in the presence of a material of such character added thereto as to react with contents of the sewage to produce a flocculant.

63. The method of treating sewage, which consists in subjecting the same to the effects of a germicide added thereto, subdividing the solids and semi-solids therein and agitating the same after, during or before addition of said germicide in the presence of calcium hydroxid added thereto in such quantity as to rapidly react with contents of the sewage to produce a flocculant.

64. The process of treating liquid, which consists in adding thereto a material of such character and in such quantity as to insure free alkali therein after reacting with contents of the liquid, and passing electric current therethrough to produce nascent oxygen, and subjecting oxidizable content of said liquid thereto.

65. The method of treating liquid having matter in suspension and organic matter in solution therein, which consists in passing electric current therethrough in the presence of a material of such character added thereto that under the stimulus of the electric current said material reacts with said organic matter in solution in said liquid to produce an insoluble flocculant for carrying down said suspended matter.

66. The process of treating liquid containing organic matter in solution, which consists in adding thereto an hydroxid which under the stimulating effect of electric current passed therethrough produces an insoluble flocculant.

67. The method of treating sewage having a carbonate in solution therein, which consists in passing electric current therethrough in the presence of a material of such character added thereto that under the stimulus of the current said carbonate is converted into a flocculant.

68. The method of treating liquid or sewage which in the raw state contains free carbon dioxid or carbonic acid or soluble carbonate, which consists in electrolyzing the same in the presence of a material of such character and in such quantity added thereto as to form with the carbon dioxid or carbonic acid or soluble carbonate an insoluble carbonate and to insure free alkali in the liquid, whereby the insoluble carbonates will rapidly sedimentize.

69. The method of treating liquid containing carbon dioxid or carbonic acid, which consists in passing electric current therethrough in the presence of a material of such character added thereto as to react with the carbon dioxid or carbonic acid to produce an insoluble compound.

70. The method of treating sewage or liquid containing putrescible material, which consists in adding thereto a material of such character and in such quantity as to insure free alkali therein, passing electric current therethrough to produce nascent oxygen, whereby the effluent is non-putrescent and is alkaline.

In testimony whereof I have hereunto affixed my signature in the presence of the two subscribing witnesses.

CLARENCE P. LANDRETH.

Witnesses:
NELLIE FIELD,
ALICE S. MARSH.